Nov. 20, 1934.   R. E. NEWELL   1,981,707
THERMOSTATIC CONTROL SYSTEM
Filed May 1, 1931
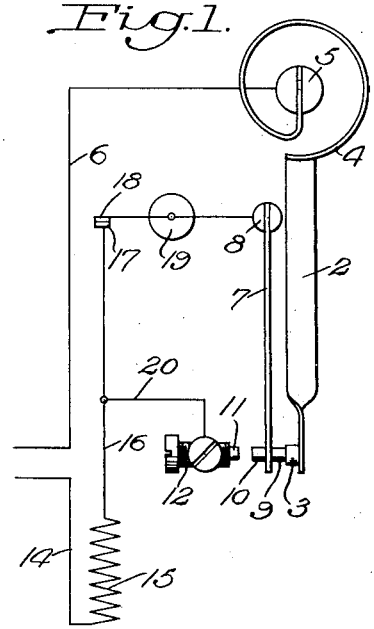
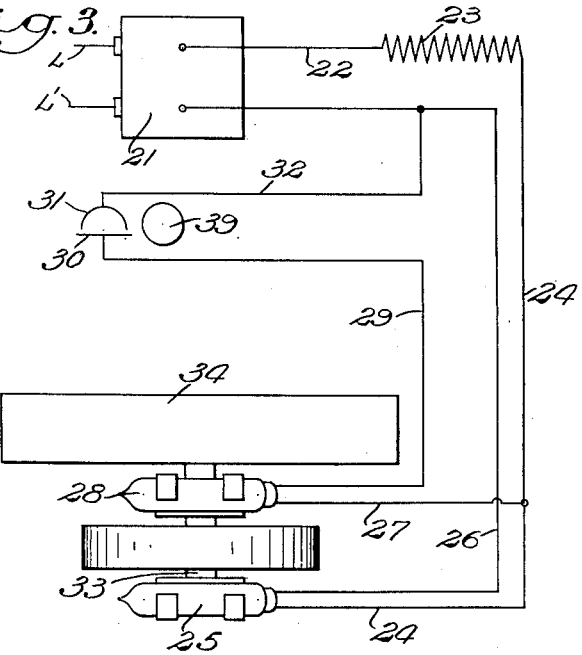
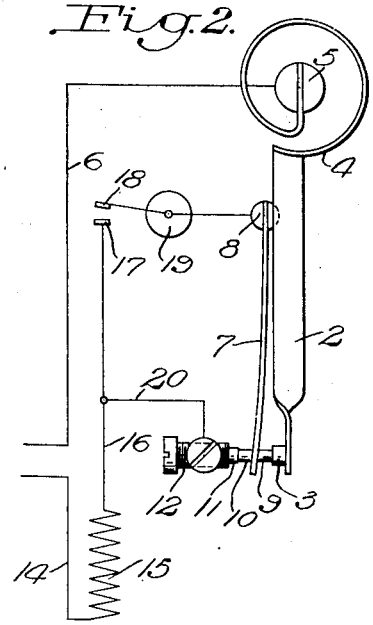
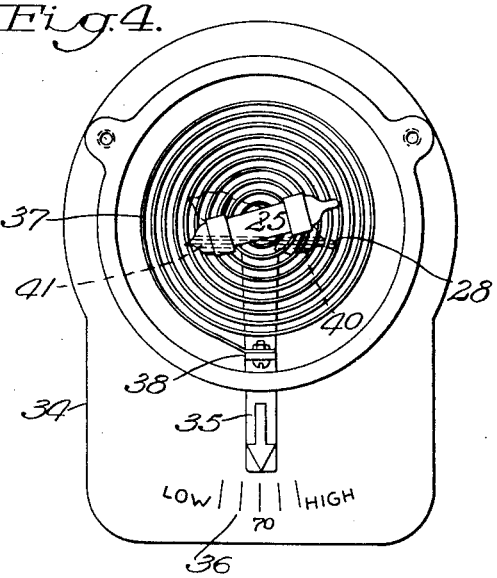
INVENTOR
Robert C. Newell, Patented Nov. 20, 1934

1,981,707

UNITED STATES PATENT OFFICE 1,981,707

THERMOSTATIC CONTROL SYSTEM

Robert E. Newell, Irwin, Pa., assignor to Robertshaw Thermostat Company, Youngwood, Pa., a corporation of Pennsylvania Application May 1, 1931, Serial No. 534,209

2 Claims. (Cl. 236—46)

The present invention relates broadly to the art of temperature responsive mechanisms, and more particularly to systems of the character ordinarily referred to as room thermostats or thermostatic control systems in which a remote control, usually positioned in a room the temperature of which is to be regulated, is effective for controlling the heat production of a suitable heating system.

At the present time it is customary in the art to which the present invention relates to provide clock operated room thermostats, a typical form of which is shown in the patent to Denison, 1,493,739. Such systems customarily include a day and night control obtained by the use of two thermostats. The present invention relates to an improved system in which the results of the dual thermostatic system of the Denison patent are obtained by the use of a single thermostat in combination with time controlled means for switching an electric circuit from a day circuit to a night circuit.

In the accompanying drawing I have illustrated diagrammatically certain embodiments of the present invention for the purpose only of explaining the general construction and method of operation thereof. In the drawing:

Figure 1 is a diagrammatic view of one form of clock operated room thermostatic system in which the parts are shown in the position they assume during one period, hereinafter referred to as the day period;

Figure 2 is a view similar to Figure 1, illustrating the parts in the position they occupy in a second period, hereinafter referred to as the night period;

Figure 3 is a diagrammatic view of a modified embodiment of the invention; and

Figure 4 is a side elevational view of the structure illustrated in Figure 3.

Throughout the following description and claims the terms "day period" and "night period" or "day temperature" and "night temperature" have been used by way of descriptive explanation, it being understood that the language is inclusive of structures effective for maintaining different temperature conditions for different periods regardless of the actual nature of the periods themselves.

Referring more particularly to Figures 1 and 2 of the drawing, there is illustrated a thermostatic bar or blade 2 carrying at one end a day contact 3 and at its opposite end formed into a coil 4, the inner end of the coil being mounted on a stud 5 with which is adapted to cooperate a suitable index pointer, as shown for example in the patent referred to, and effective for adjusting the thermostat to different temperatures. In electrical connection with the stud 5 is a conductor 6 leading from a suitable source of electrical current not shown.

Extending in substantial parallelism to the thermostatic blade 2 is a flexible contact carrying strip 7 having a fixed mounting 8. At its lower end, the flexible strip 7 carries a day contact 9 on one side thereof and a night contact 10 on the opposite side thereof. The night contact is in turn adapted to cooperate with the second night contact 11 adjustable by means of a screw 12.

The opposite side of the electrical circuit includes a conductor 14 leading from the source before referred to and connected to one side of a suitable heat responsive motor 15. This motor may be of any desired structure, as well understood in the art, and one form of which is illustrated in Figure 4 of the patent to Goodhue et al., 1,603,593 of October 19, 1926. Leading from the motor 15 is a conductor 16 carrying a contact 17. Cooperating with the contact 17 is a movable contact 18 adapted to be operated by a clock mechanism 19 effective periodically, according to the setting of the clock mechanism, for opening and closing the contacts 17 and 18. In Figure 1 the contacts are illustrated as in closed position, this being the position which they normally occupy during the day period. The parts are further shown with the two day contacts 3 and 9 in current carrying relationship, this being the position assumed when a decrease in temperature in the room in which the thermostat is placed has caused the blade 2 to swing in a clockwise direction. At this time the circuit including the motor 15 is energized, whereby the motor is effective for opening a valve, as shown in the Goodhue et al. patent referred to, and thereby permitting the passage of gas, oil or the like to a suitable burner not shown. Such fuel, upon being burned, will be effective for increasing the temperature in the room and thereby causing the thermostatic blade 2 to swing in a counter-clockwise direction and separate the contacts 3 and 9, thus opening the motor circuit and permitting the valve to close.

At a predetermined time, according to the setting of the clock mechanism, the contacts 17 and 18 will be moved to open position as illustrated in Figure 2. Thereafter, the bringing together of the day contacts 3 and 9 will have no effect on the motor 15. Thus, a decrease in temperature in a room will cause the thermostatic blade 2 to flex the strip 7 and thereby bring the contacts 10 and 11 into conducting relationship. At this time the circuit to the motor 15 will be completed through conductor 6, blade 2, contacts 3 and 9, strip 7, contacts 10 and 11, screw 12 and conductors 20 and 16 to one side of the motor, the opposite side of which is connected to the current source by the conductor 14. Thus the motor will again be operated for opening the valve and thereby permitting a desired increase in heat within the room to be obtained. By way of example, it may be assumed that the thermostat 2 is so set that the contacts 3 and 9 will be brought together at a temperature of 70° for the day period, while the contacts 10 and 11 will come into engagement at a temperature of 60°.

By reason of the construction shown, a single thermostat is effective for controlling both the day temperature and the night temperature, the control being obtainable by reason of switching from a day circuit to a night circuit. The differential in temperature between the day and night contacts is controllable by means of the screw 12.

In the embodiment of the invention illustrated in Figures 3 and 4 there are shown line wires L and L' leading from a suitable source, not shown, to a transformer 21, which transformer has a conductor 22 leading to a motor 23 of any desired construction. This motor may be of the same type as that before described, whereby when energized it will be effective for opening a fuel valve. The opposite side of the motor 23 has a conductor 24 leading to a night switch 25 herein illustrated as being of the mercoid type, the opposite terminal of which is connected by a conductor 26 to the opposite terminal of the transformer.

Branching from the conductor 24 is a line 27 leading to a day switch 28, also shown as being of the mercoid type, and having its opposite terminal connected by a line 29 to a fixed contact 30 corresponding to the contact 17 before described. Cooperating with this contact is a movable clock controlled contact 31 connected by a line 32 to the conductor 26.

The two mercoid switches 25 and 28 are mounted on a stud 33 projecting forwardly from a base 34. Movably mounted on this stud is an indicator finger 35 cooperating with a scale 36. Intermediate the switches is a thermostatic coil 37 having one end 38 thereof connected to the finger 35, and having its opposite end connected to the stud 33. By reason of this construction it will be apparent that a decrease in the temperature to which the thermostatic coil 37 is subjected will cause the stud 33 to rotate in a clockwise direction, while an increase in temperature will cause it to expand and thus rotate the stud in a counter-clockwise direction. The movable contact 31 is adapted to be controlled in known manner by a clock mechanism 39.

In the embodiment of the invention illustrated in Figure 3, the parts are illustrated in the position they occupy after the clock mechanism has moved the contact 31 away from the contact 30. As will be apparent from Figure 4, the temperature has dropped to such an extent that the thermostat has moved the day switch 28 to a position in which the circuit between the line wires 27 and 29 would be closed by the mercury 40. Inasmuch, however, as the day circuit including the contacts 30 and 31 is open, nothing happens with the parts in this position. Further drop in temperature, however, will swing the night switch 25 from the position illustrated in Figure 4 in a clockwise direction until it reaches a position corresponding to the position of the day switch. At this time the mercury 41 therein will move from the left hand end of the switch to the right hand end, and thereby close the circuit between the conductors 24 and 26, thus energizing the motor 23 and thereby opening the fuel valve for the purpose of supplying further heat. This condition will continue until the heat is sufficient to swing the night switch 25 in a counter-clockwise direction to the extent required for breaking the circuit between the conductors 24 and 26. Thus, during the night period the entire operation of the motor 23 will be dependent upon the night switch 25, while during the day period its operation will be dependent upon the day switch 28.

These switches may be so carried by the stud 33 as to be adjustable thereon so as to control the temperature differential between the night period and the day period. It may be assumed that the clock mechanism has been set to open the day circuit at 10:00 P. M. and that for some reason it is desired to continue the day temperature beyond that time. In such case this may be accomplished by simply moving the pointer 35 a distance equal to the difference in day and night temperature settings. Thus if the night temperature is 60° and the day temperature 70°, by moving the pointer 35 to 80°, the night switch 25 is brought into a position in which it will operate in the same temperature range as that in which the day switch 28 operates with the pointer set at 70. Thereafter the pointer may again be moved to 70 and the desired day and night temperatures automatically obtained.

The present invention possesses the advantages of providing a remote control in which a single thermostatic element is effective for controlling the temperature during two different periods, such a differential control being obtainable by reason of a circuit switching condition obtained in any desired manner as for example by the use of a suitable clock mechanism. In this manner the provision of separate day and night thermostats as provided heretofore is obviated, and the desired control more expeditiously effected.

While I have herein illustrated and described certain preferred embodiments of the invention, it will be apparent that changes in the construction and operation of the parts may be made without departing either from the spirit of the invention or the scope of my broader claims.

I claim:

1. In a temperature responsive system, a motor to be energized, a day circuit and a night circuit for said motor, a shaft, a thermostat for rotating the shaft, a pair of mercoid switches on the shaft in relatively different angular positions, one of said switches being in the day circuit and the other in the night circuit, and being so arranged that continued operation of the shaft in one direction successively operates the switches, and time operated means for automatically opening one of the circuits at a predetermined time and closing it thereafter after a predetermined time interval.

2. In a temperature responsive system, a motor to be energized, a day circuit and a night circuit for said motor, a shaft, a thermostat for rotating the shaft, a pair of mercoid switches on the shaft in relatively different angular positions, one of said switches being in the day circuit and the other in the night circuit, and being so arranged that continued operation of the shaft in one direction successively operates the switches, and time operated means for automatically opening the circuit in which the first of said switches to be operative upon rotation of the shaft is located at a predetermined time and closing it thereafter after a predetermined time interval.

ROBERT E. NEWELL.